C. H. GAYLORD.
Combined Hoes and Choppers.

No. 158,270.

Patented Dec. 29, 1874.

WITNESSES:
G. Matthys.
Solon C. Kemon

INVENTOR:
Chas. H. Gaylord
BY
ATTORNEYS.

UNITED STATES PATENT OFFICE.

CHARLES H. GAYLORD, OF OSCEOLA, ARKANSAS, ASSIGNOR TO HIMSELF AND WILLIAM B. HASKINS, OF SAME PLACE.

IMPROVEMENT IN COMBINED HOES AND CHOPPERS.

Specification forming part of Letters Patent No. 158,270, dated December 29, 1874; application filed November 12, 1874.

*To all whom it may concern:*

Be it known that I, CHARLES H. GAYLORD, of Osceola, in the county of Mississippi and State of Arkansas, have invented a new and Improved Combined Hoe and Chopper; and I do hereby declare that the following is a full, clear, and exact description of the same, reference being had to the accompanying drawing, forming a part of this specification, in which—

Figure 1:
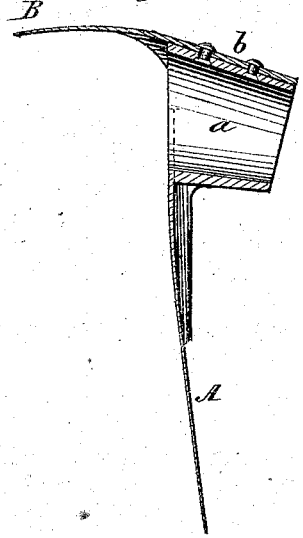
Figure 2:
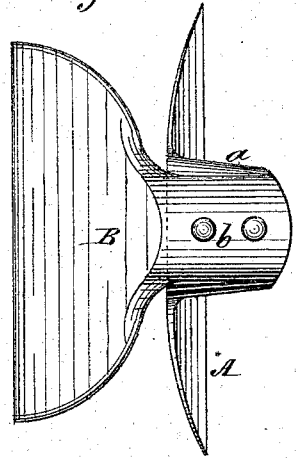

Figure 1 is a longitudinal vertical section, and Fig. 2 a plan view.

The invention relates to improvements for chopping about cotton, corn, and other plants, for the purpose of eradicating the weeds, thinning out the number of plants in a hill, or removing suckers.

The invention will first be fully described, in connection with all that is necessary to a full understanding thereof, and then pointed out in the claim.

A represents the ordinary hoe-blade, with which the workman usually does the entire work, and which is used very effectively as well as conveniently, for chopping on each side as he walks up and down the rows of plants. They are, however, very clumsy and awkward for cutting by a push from the front of the plant, chopping in the rear, or for cutting out unnecessary plants. In order to overcome this objection to the implement now in public use, I have added a supplementary blade, B, placed at a right or slightly obtuse angle to the ordinary blade A, and having its transversely-curved shank $b$ bolted to the top of the socket or eye $a$.

The operation is as follows: The workman, as he passes along the row, cuts up the soil on each side of the plants by chopping toward himself, and then, making a half-revolution of the hoe-handle, cuts the weeds or surplus plants in front and those in the rear by a push or chop from himself. This is all done without changing his position, which would greatly augment the labor and time necessary for a given amount of work.

Having thus described my invention, what I claim as new is—

The supplementary blade B, arranged at a right or slightly obtuse angle to the ordinary hoe-blade A, as and for the purpose specified.

C. H. GAYLORD.

Witnesses:
 SOLON C. KEMON,
 EDWD. W. BYRN.